(12) United States Patent
Malaksamudra et al.

(10) Patent No.: US 9,710,833 B2
(45) Date of Patent: Jul. 18, 2017

(54) METHOD AND APPARATUS FOR ENABLING CONCURRENT RATING DURING A RE-RATING OPERATION

(71) Applicant: Oracle International Corporation, Redwood Shores, CA (US)

(72) Inventors: Gireesh Malaksamudra, Sunnyvale, CA (US); Raghavassimhan Komboorsundararajan, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 84 days.

(21) Appl. No.: 14/259,503

(22) Filed: Apr. 23, 2014

(65) Prior Publication Data

US 2015/0310512 A1    Oct. 29, 2015

(51) Int. Cl.
*G06Q 30/04* (2012.01)
*G06Q 30/00* (2012.01)

(52) U.S. Cl.
CPC .......... *G06Q 30/04* (2013.01); *G06Q 30/016* (2013.01); *H04M 2215/74* (2013.01)

(58) Field of Classification Search
None
See application file for complete search history.

(56) References Cited

U.S. PATENT DOCUMENTS

| | | | |
|---|---|---|---|
| 8,965,861 B1* | 2/2015 | Shalla | G06F 9/546 707/703 |
| 2010/0228707 A1* | 9/2010 | Labuda | G06F 17/30351 707/702 |
| 2015/0181045 A1* | 6/2015 | Lang et al. | 705/34 |
| 2015/0206116 A1* | 7/2015 | Bess et al. | G06Q 20/202 |

* cited by examiner

*Primary Examiner* — Scott Zare
(74) *Attorney, Agent, or Firm* — Invoke

(57) ABSTRACT

The present disclosure provides for enabling concurrent rating during a re-rating operation. A first notification is received. The first notification indicates that a re-rating process, which comprises a modification to a customer state for a customer service account, has been initiated for the customer service account. A concurrent usage request is received while the re-rating process is ongoing. The concurrent usage request comprises a request to perform a transaction affecting the customer service account. The concurrent usage request is then processed.

20 Claims, 11 Drawing Sheets

Re-rating with Concurrent Usage

Correct Sequence of Events

Out-of-Order Usage Requests

Prepare to Re-rate

Re-rating Process

Re-rating Process

Processing Usage Requests

Replaying Concurrent Events
After Re-rating Process

Synchronizing Customer State At
Billing Management System

METHOD AND APPARATUS FOR ENABLING CONCURRENT RATING DURING A RE-RATING OPERATION

FIELD OF THE INVENTION

This invention relates to rating charges for service requests, and more particularly, to rating service requests received during a re-rating operation.

BACKGROUND OF THE INVENTION

Rating is a process by which a charge is determined for a service request. A re-rating process is typically performed after the rating process has been completed in order to correct or change charges previously calculated for a service request. Customer service accounts are typically blocked or unusable while the re-rating process is ongoing.

SUMMARY OF THE INVENTION

The present disclosure provides for enabling concurrent rating during a re-rating operation. A first notification is received. The first notification indicates that a re-rating process, which comprises a modification to a customer state for a customer service account, has been initiated for the customer service account. A concurrent usage request is received while the re-rating process is ongoing. The concurrent usage request comprises a request to perform a transaction affecting the customer service account. The concurrent usage request is then processed.

BRIEF DESCRIPTION OF THE DRAWINGS

The present invention may be better understood, and its numerous objects, features and advantages made apparent to those skilled in the art by referencing the accompanying drawings.

Figure 1:
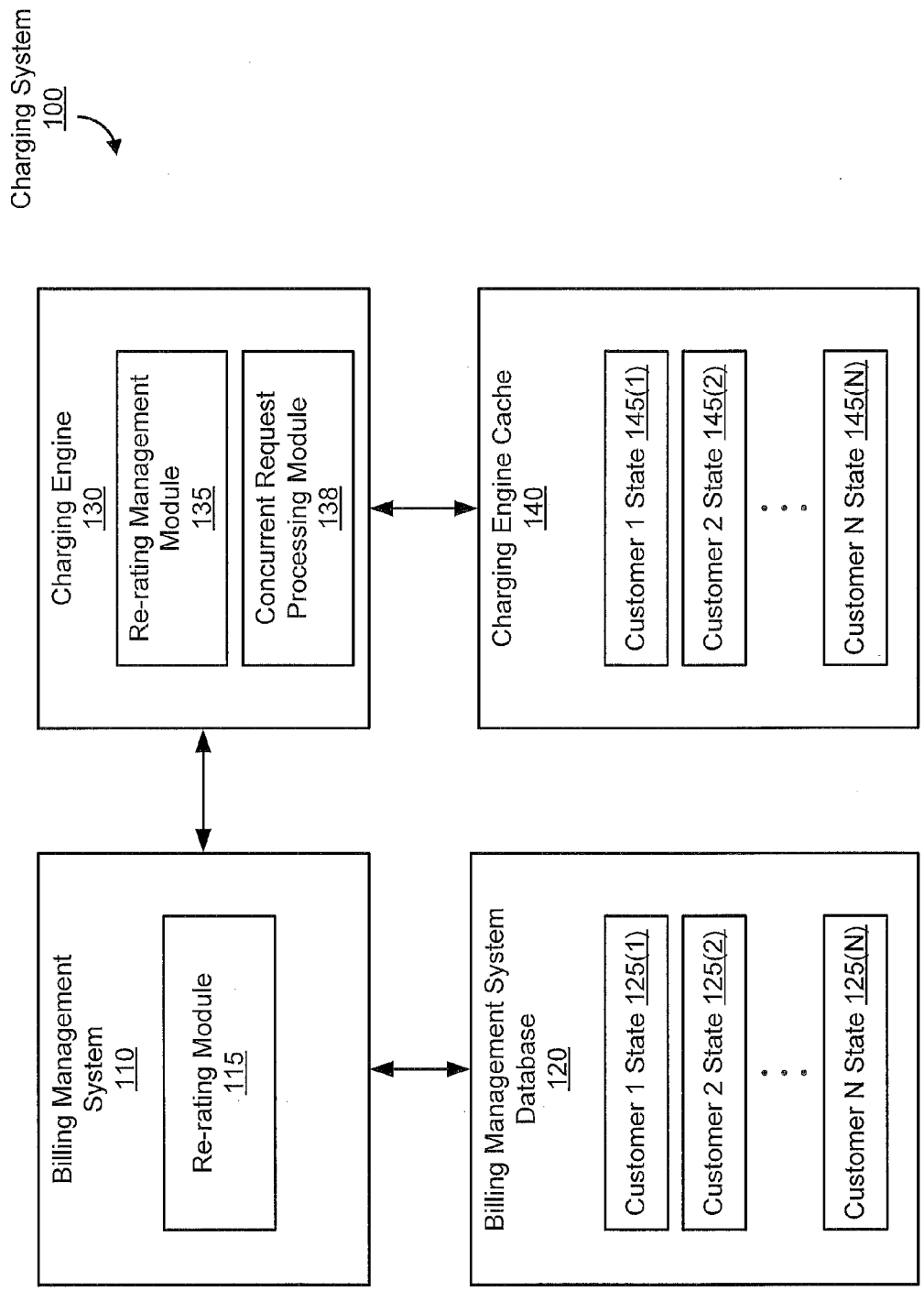
FIG. 1 is a simplified block diagram illustrating components of an example charging system in which the present disclosure can be implemented, according to one embodiment.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intentions are to cover all modifications, equivalents, and alternatives falling within the spirit and scope of the present disclosure as defined by the amended claims.

DETAILED DESCRIPTION

Rating is a process by which charges applicable to a service request are calculated. A service request is a request submitted by a customer to request usage of a service (e.g., telecommunication service, shipping service, utility service, etc.). Requests for such services are hereinafter referred to, in the generic, as usage requests. In addition, services are typically provided to a customer (e.g., a paid subscriber) by a service provider. A service offered to a customer by the service provider (also referred to as a customer service provider) is hereinafter referred to as a customer service. An account maintained by the customer service provider for the customer service is hereinafter referred to as a customer service account.

Typically, a customer submits a usage request to a customer service provider to request usage of the customer service. The usage request may be received, for example, by a charging system implemented by the customer service provider. The charging system, upon receiving the usage request, will authorize the usage request and, if allowable, rate the usage request based on customer information (such as pricing configurations). The rating process thus involves the calculation of a rate for the usage being requested and the calculation of an applicable charge for the usage. The usage by the customer is treated as an event within the customer service account.

Re-rating is a process that is performed subsequent to the rating process, in order to revise the original charges calculated for events that have already occurred within the customer service account. These events are hereinafter referred to as previous events within the customer service account. Typically, a re-rating process is initiated by a customer service provider as a result of a change desired by the customer and/or the customer service provider.

A re-rating process might be desirable, for example, to incorporate a change in pricing. For instance, a telecommunication service provider may want to change a rate applied to voice calls made by a customer from $1 per minute to $0.50 per minute. Such a change would affect previous charges for previous voice calls. Thus, a re-rating process may be desirable to re-calculate charges for the previous events using the new rate, thereby updating a customer's remaining balances (e.g., amounts owed, available minutes, available data storage/transfer, etc).

Another reason to re-rate events within a customer service account may be to incorporate a subscription change. A customer or customer service provider may wish to add, delete, or modify a customer service. For example, a customer may wish to increase the total amount of talk-time minutes allowed per month from 500 minutes to 1000 minutes. A re-rating process may be desirable to correct charges for voice calls occurring prior to the subscription change.

Yet another reason to perform a re-rating process may be to correct out-of-order events within the customer service account. A charging system may have processed events in an incorrect order within the customer service account. Accordingly, a charging system may seek to reprocess charges for previous events in the correct order thereby correcting overall balances within the customer service account.

When a re-rating process is ongoing, most charging systems do not allow for concurrent usage (e.g., usage of a customer service while the re-rating is being performed). Concurrent requests are usually blocked while the re-rating process is ongoing or delayed until the re-rating process is complete. The blocking or delaying of usage requests during a re-rating process is performed to ensure that information used to determine a charge for an event does not keep changing as a result of concurrent usage. Several issues may arise from such an approach, including service interruption for the customer or potential credit exposure when concurrent usage requests are received.

FIG. 1 illustrates an exemplary charging system 100 that enables concurrent usage, while a re-rating process is ongoing. Charging system 100 may be implemented by a customer service provider, as shown. Charging system 100 includes a billing management system 110 (which further includes a re-rating module 115) and a billing management system database 120 (which further includes a plurality of customer states for a plurality of customers, illustrated as customer 1 state 125(1), customer 2 state 125(2), customer N state 125(N), and so on, which are collectively referred to as customer states 125). Charging system 100 further includes a charging engine 130 (which further includes a re-rating management module 135 and a concurrent request processing module 138) and a charging engine cache 140 (which further includes a plurality of customer states for the plurality of customers, illustrated as customer 1 state 145(1), customer 2 state 145(2), customer N state 145(N), and so on, which are collectively referred to as customer states 145). Each component is discussed in detail below.

As a whole, charging system 100 is able to receive usage requests, determine a rate for the usage requests, calculate charges for the usage requests, maintain customer state information (e.g., running balances) for a customer service account, provide notifications to customers regarding their usage, and bill customers accordingly. In addition, charging system 100 can also perform one or more re-rating processes, as needed, and revise existing customer states in response thereto. Moreover, charging system 100 can also process concurrent usage requests and subsequently replay concurrent events on the revised customer states. Thus, charging system 100 allows a re-rating process to be performed at any time, without blocking or delaying concurrent usage requests, as before. By doing so, customers are able to continue using a customer service, with little-to-no interruption due to re-rating processes.

Billing management system 110 is a system that uses customer state information (such as customer states 125) to generate bills for customer service usage. Billing management system 110 is coupled to billing management system database 120, where customer states 125 are stored for a number of customers. Customer states 125 are generally synchronized with customer states 145 at charging engine cache 140 (with one exception being the time period when a re-rating process is ongoing).

Charging engine 130 is a system that receives and rates usage requests. A usage request includes information about the usage being requested (e.g., the type of customer service being requested, the amount of usage being requested (e.g., an amount specified by a numerical value, a bandwidth, an amount of data, or the like), and other parameters). Using this information (also referred to herein as usage information), charging engine 130 can determine an applicable rate for the usage request using customer states 145.

Customer states 145 are stored and maintained by charging engine cache 140. Customer states 145 include a variety of information including customer pricing configurations, service account balances, customer discounts, and the like. Once a rate is determined, charging engine 130 can calculate a charge for the usage being requested. Information regarding the usage request and the calculated charge are communicated to billing management system 110 at one or more various times for synchronization therein.

An update request is received by charging system 100 in order to initiate a re-rating process. The update request may identify the one or more customers affected by the re-rating process, as well as a re-rating time frame (e.g., identifying a starting and ending time) for each customer. Additionally, the update request may identify one or more previous events to be re-rated.

In response thereto, re-rating module 115 initiates a process to prepare for the re-rating process. In certain embodiments, re-rating module 115 performs the re-rating process, but operates in conjunction with re-rating management module 135 to ensure it is acceptable for the process to be performed. Re-rating module 115 begins preparations for a re-rating process by querying re-rating management module 135 as to whether a re-rating process is possible. Re-rating management module 135 may respond in the affirmative or the negative based on whether charging engine 130 is experiencing any backlog and/or whether other re-rating processes are currently underway for one or more customers.

In cases where a re-rating process is possible, re-rating management module 135 notifies re-rating module 115 accordingly. Re-rating module 115 proceeds by initiating the re-rating process and notifying re-rating management module 135. In response thereto, re-rating management module 135 can revise customer state information maintained for the one or more customers to indicate that the one or more customers are in a re-rating state, thus, ensuring that any usage requests received during the re-rating process are treated as concurrent usage requests.

In one embodiment, the re-rating process is initiated when re-rating module 115 locks customer states 125. Doing so prevents usage requests from being processed until the re-rating process is completed by re-rating module 115. After customer states 125 have been locked, re-rating module 115 performs the re-rating process for the one or more customers. Details regarding the re-rating process can be seen in FIGS. 5A and 5B. At the end of the re-rating process, re-rating module 115 identifies revised customer states for the one or more customers and saves the revised customer states as customer states 125.

While re-rating module 115 is performing the re-rating process, concurrent request processing module 138 may detect and process concurrent usage requests. A concurrent usage request is processed as before, with the exception that charging engine 130 does not notify billing management system 110 of the concurrent usage requests and/or charges related to the concurrent usage request (given that re-rating module 115 has locked customer states 125 and thus will not allow usage requests while in this state).

Whenever a concurrent usage request is received by concurrent request processing module 138, concurrent request processing module 138 checks and confirms that the customer to which the concurrent usage applies is undergoing a re-rating process (e.g., based on the customer re-rating state). Thereafter, concurrent request processing module 138 authorizes, rates, and charges the concurrent usage request using customer states 145 and the most current balance information therein. In response thereto, the customer that sourced the concurrent usage request may be sent notifications related to the concurrent usage request. However, information related to the concurrent usage will not be transmitted to billing management system 110, but is instead stored in a cache (e.g., a cache accessible by concurrent request processing module 138).

Once the re-rating process is complete, re-rating management module 135 receives a revised customer state from re-rating module 115, which reflects the effects of the re-rating process. Concurrent request processing module 138 is notified that the re-rating process is complete. Thereafter, concurrent request processing module 138 performs a replay of the concurrent events (e.g., events resulting from the processing of the concurrent usage requests) on the revised customer state to determine a newly-revised customer state that reflects the effects of the re-rating process and the concurrent events. Customer states 145 and 125 are then synchronized to reflect the newly-revised customer state for each affected customer.

Additional re-rating processes may also be performed for customers at a later time, if needed. These additional re-rating processes are performed in a similar manner and concurrent usage requests would likewise be allowable and processed as explained above.

Figure 2:
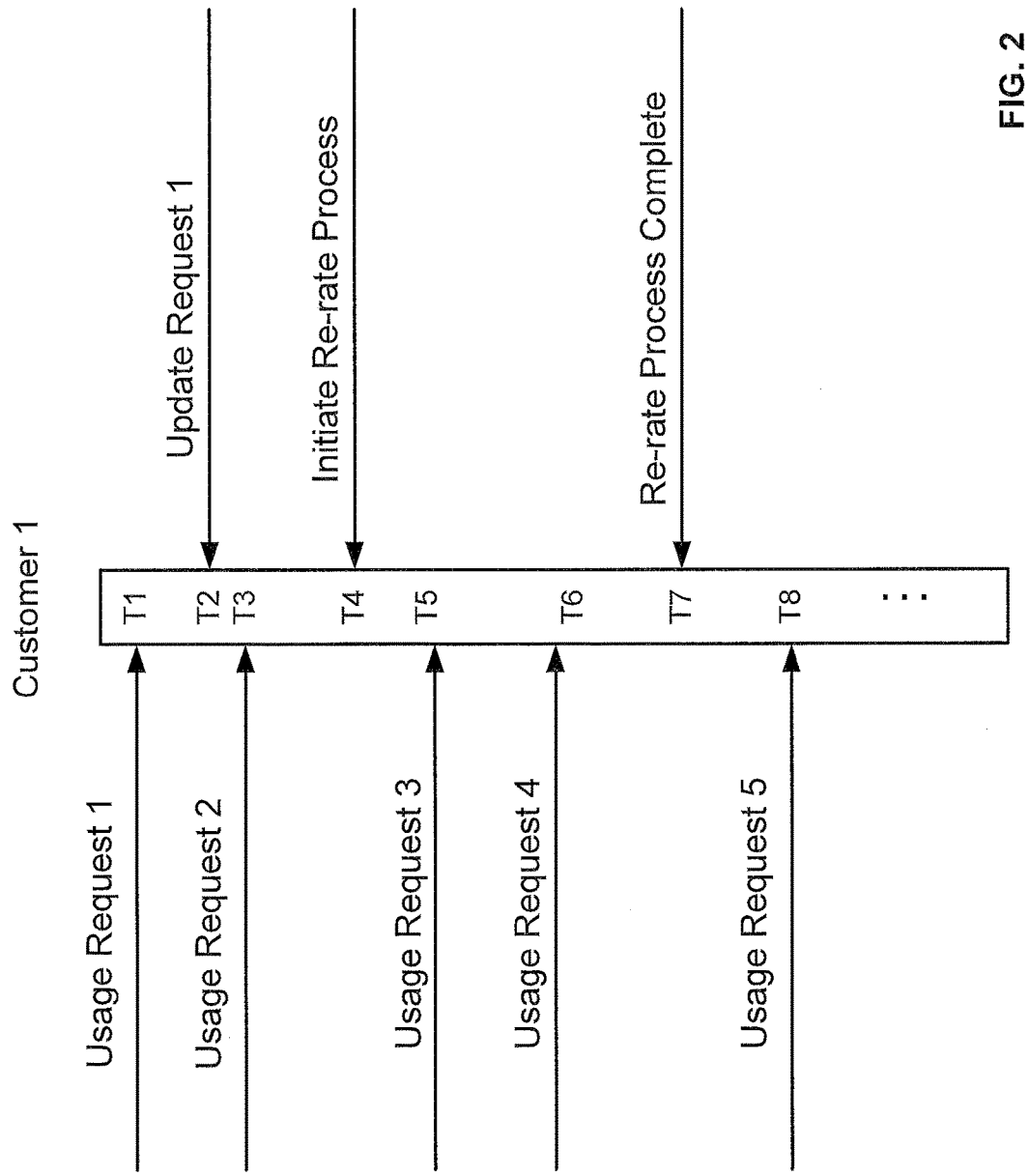
FIG. 2 is a simplified timeline illustrating a re-rating process with concurrent usage, according to one embodiment.

FIG. 2 is a simplified timeline illustrating a re-rating process with concurrent usage. A re-rating process is typically performed by a re-rating module (e.g., such as re-rating module 115 of FIG. 1), while concurrent usage is allowed and processed by a concurrent request processing module (e.g., such as concurrent request processing module 138 of FIG. 1).

As shown, the timeline of FIG. 2 is specific to a first customer (e.g., customer 1). A set of specific time periods are also shown as T1, T2, T3, T4, T5, T6, T7, T8, and so on. These time periods are intended to be time periods in chronological order. For example, T1 is a time period that occurs before T2 and all other time periods shown. Moreover, usage requests are illustrated with arrows on the left hand side to indicate such functionality is initiated by customer 1. Alternatively, update requests and actions relating to a re-rating process are illustrated with arrows on the right hand side to indicate such functionality is initiated by a customer service provider.

FIG. 2 illustrates that at T1, a first usage request, illustrated as usage request 1, is received from customer 1. Usage request 1 is processed according to a customer state that is current at T1. At T2, an update request, illustrated as update request 1, is received. Update request 1 is a request to synchronize any changes within a customer service account, as captured by a billing management system, to a charging engine. As an example, if a customer service account has changed (e.g., due to the introduction of a new offer or an increase in a customer state balance), such changes would be transmitted over to the charging engine for synchronization and use therein.

As shown, a second usage request, illustrated as usage request 2, is received at T3. At this point, usage request 2 may be processed taking into account the changes to the customer service account resulting from update request 1. In addition, usage request 2 will be processed using a customer state that is current as of T3. In some cases, however, the changes captured by update request 1 at T2 may be retroactively valid before that time and hence usage request 1 should have accounted for the changes identified by update request 1. In such scenarios, a re-rating process would be desirable to update the customer state accordingly (e.g., to correct the customer state at T1 used to process usage request 1 and to correct the customer state at T3 used to process usage request 2).

At a later point in time, indicated as T4, the re-rating process is initiated. Usage requests that are received after T4 will be allowed and processed as concurrent requests. As shown, a third usage request, usage request 3, and a fourth usage request, usage request 4, are received after the re-rating process has been initiated but before the re-rating process is complete.

Usage request 3 may be processed using customer state information maintained by a charging engine. Such information reflects the most up-to-date customer state (e.g., customer balances) for the customer. This information can be used to determine whether usage request 3 is allowable, and, if so, how the usage will be rated and charged to the customer service account. However, information regarding usage request 3 and corresponding rates and charges are not transmitted to a billing management system at this point. Instead, concurrent usage information is maintained at the charging engine while the re-rating process is ongoing. Once the re-rating process is complete, the concurrent usage information is used to replay charges for concurrent events thereafter.

Usage request 4 is received at T6. Given that the re-rating process is still ongoing, usage request 4 is treated similarly to usage request 3. Thus, usage request 4 is rated, charged, and deducted from the customer state maintained at the charging engine. Likewise, concurrent usage information for usage request 4 is not transmitted to a billing management system at this point. A replay of usage request 4 will also be performed once the re-rating process is complete.

At T7, a notification is received indicating that the re-rating process is complete by the re-rating module. At this point, the re-rating module can transmit a revised customer state to the charging engine to indicate the effects of the re-rating process. Once this notification is received, the concurrent request processing module can perform a replay of concurrent events (e.g., events arising from the allowance of usage requests 3 and 4) using the revised customer state. New rates and charges can then be calculated for usage requests 3 and 4, in chronological order, using the revised customer state. The charges for each are then deducted from the revised customer state to arrive at a newly-revised customer state. This newly revised customer state can then accurately reflect the effects of the re-rating process and the replay of concurrent events. The newly revised customer state is then transmitted to the billing management system for synchronization therein (e.g., to reflect the effects of the concurrent events). In addition, customer state information is also modified to indicate that customer 1 is no longer in a re-rating state.

Another usage request is then received at T8, which is shown as usage request 5. At this point, the re-rating process for customer 1 has been completed by the re-rating module and customer 1 is no longer in a re-rating state. As such, usage request 5 can be processed in the normal course. This means that usage information for usage request 5 can be transmitted to the billing management system at this point and a synchronization of customer states can occur between the billing management system and the charging engine.

Additional usage requests and/or update requests may be received from customer 1 and/or a customer service provider. These requests can be processed in the same manner as above.

Figure 3A:
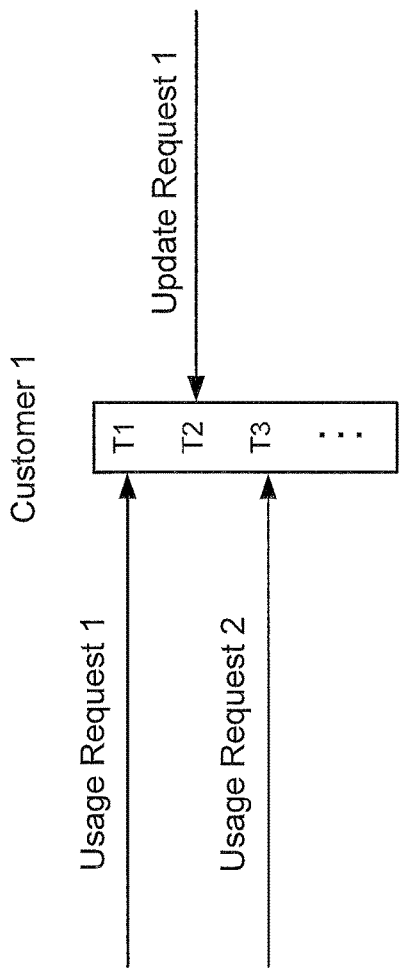
FIG. 3A is a simplified timeline illustrating an example sequence of events, according to one embodiment.

FIG. 3A is a simplified timeline illustrating an example sequence of events for a customer service account. As shown, FIG. 3A includes events for a first customer, illustrated as customer 1. The time periods are provided in chronological order and illustrated as points in time T1, T2, T3, and so on.

At T1, a first usage request, illustrated as usage request 1, is received from customer 1. Thereafter, at T2, a first update request, illustrated as update request 1, is received from a customer service provider. At T3, a second usage request, illustrated as usage request 2, is received from customer 1.

As shown, charges for usage request 1 should be calculated using customer state information that is current as of T1. At T2, customer state information may change as a result of update request 1. Hence, any usage requests received after T2 should be based on the new customer state resulting from update request 1. Accordingly, charges for usage request 2 should be calculated using customer state information that is current as of T3.

Figure 3B:
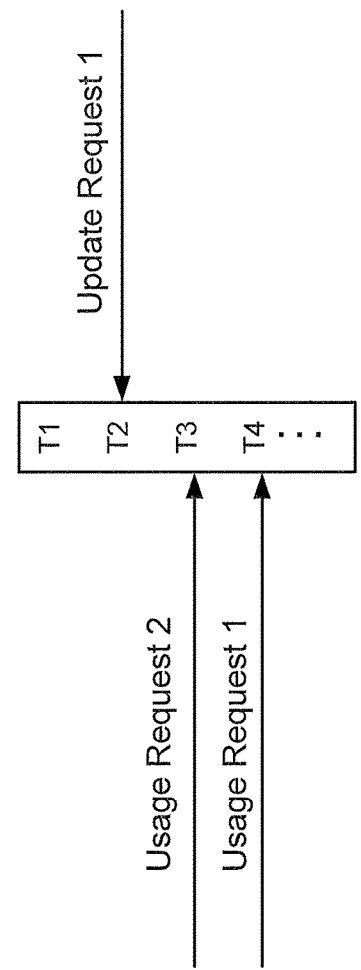
FIG. 3B is a simplified timeline illustrating an example of out-of-order usage requests, according to one embodiment.

FIG. 3B is a simplified timeline illustrating out-of-order usage requests, as compared to FIG. 3A. As shown, usage request 2 is received at T3, as before, but usage request 1 is received at T4 instead of T1. Thus, usage request 1 and usage request 2 are out-of-order. Several reasons may exist for receiving usage requests in an incorrect, non-sequential, or different order.

As shown, usage request 2 will be processed earlier than usage request 1. In addition, usage request 2 will be processed using customer state information that is current as of T3 (which does not reflect the effects of usage request 1). Likewise, usage request 1 will be processed using customer state information that is current as of T4 and not T1, as intended.

Processing usage request 1 and usage request 2 as shown will result in incorrect customer states. Thus, a re-rating process may be desirable to correct customer state information for customer 1.

Figure 4:
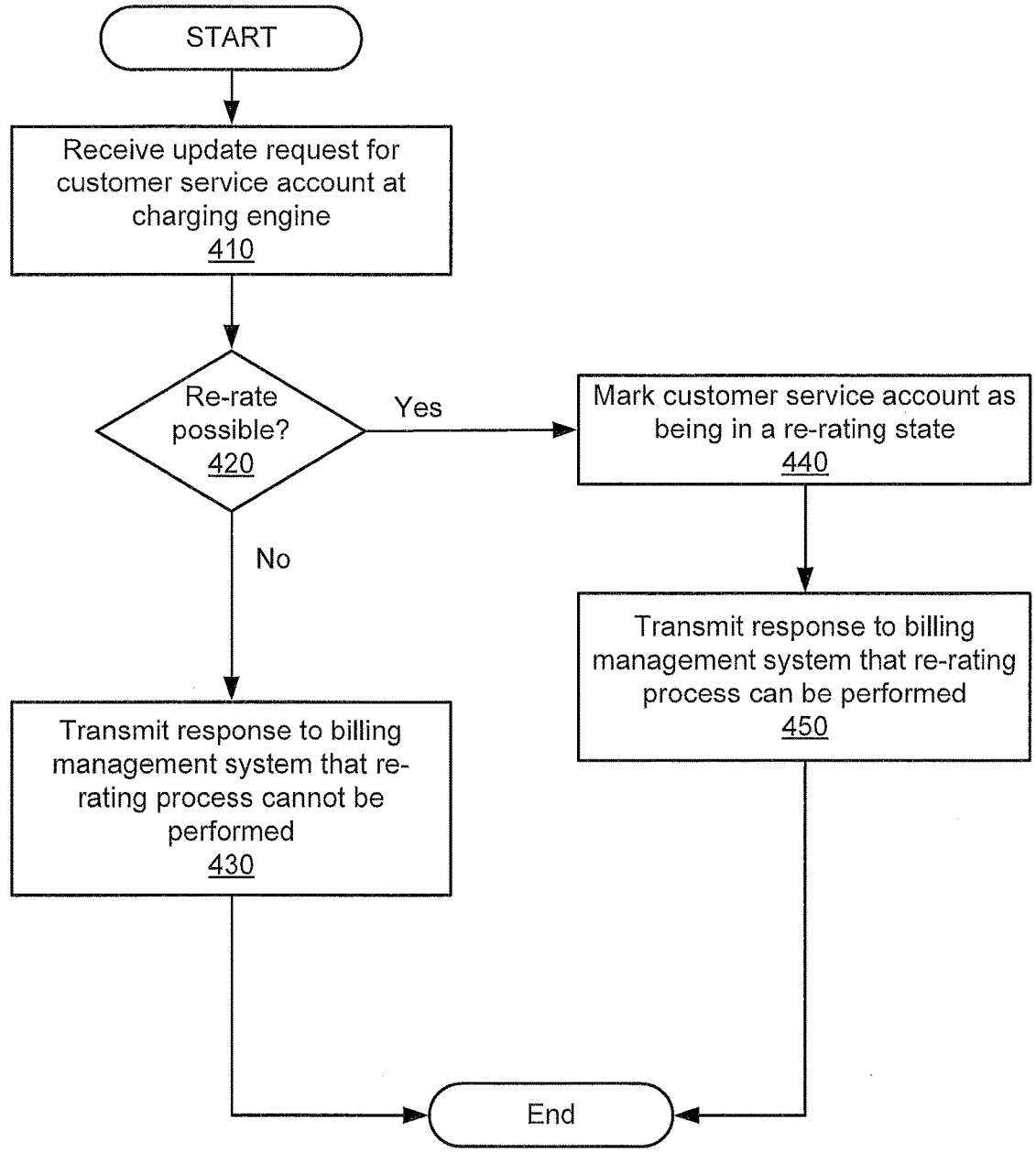
FIG. 4 is a flowchart illustrating an example process for preparing for a re-rating process, according to one embodiment.

FIG. 4 illustrates a prepare to re-rate process. The functionality of FIG. 4 is performed by a re-rating management module, such as re-rating management module 135 of FIG. 1. The process of FIG. 4 illustrates how preparations are made to re-rate events for a single customer. However, the functionality of FIG. 4 can also be performed for a plurality of customers in a similar manner.

In one embodiment, the process of FIG. 4 begins at 410, where the charging engine (e.g., and more specifically the re-rating management module) receives an update request applicable to a customer service account. The update request identifies a customer to be affected by the re-rating process. At 420, the re-rating management module determines whether the re-rating process being requested is possible. Several factors are considered for such a determination. These factors include the amount of backlog in the charging engine, whether other re-rating processes are currently ongoing, and so on.

If a determination is made that the re-rating process is not possible, the process continues to 430. At 430, the re-rating management module formulates and transmits a response to the re-rating module to indicate that the re-rating process cannot be performed at this time. The update request can then be postponed until a later point-in-time.

Alternatively, if the re-rating management module determines that the re-rating process is possible, the process continues to 440. At 440, the re-rating management module changes customer state information to indicate that the customer service account is in a re-rating state. Doing so allows the concurrent request processing module to determine how to process additional requests that may be received during the re-rating process.

Figure 5A:
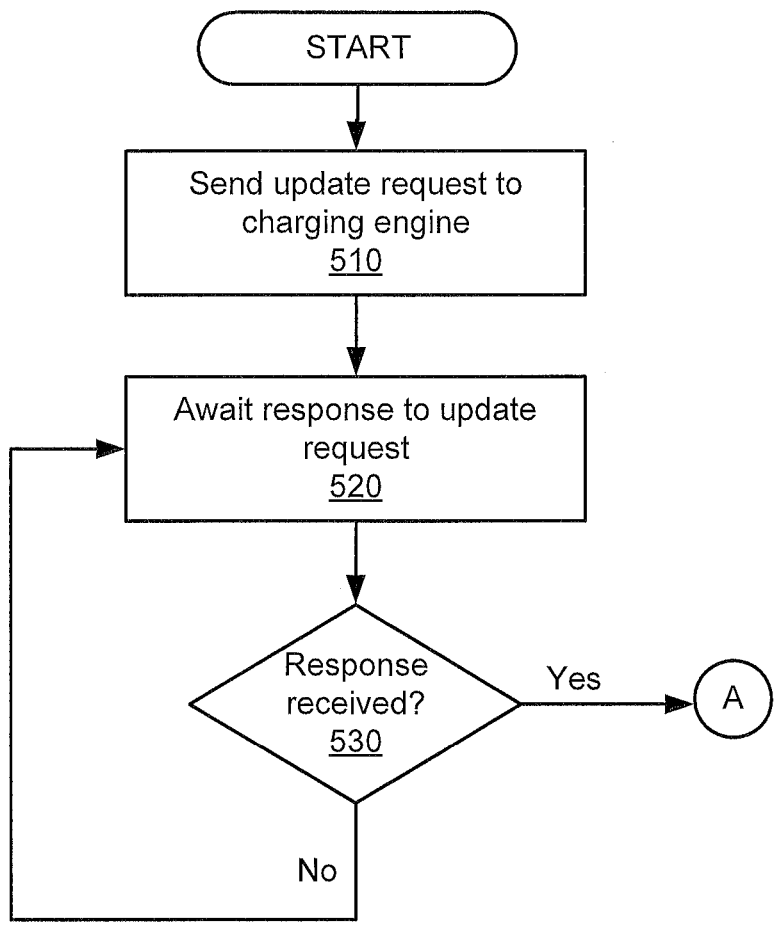
FIG. 5A is a flowchart illustrating an example process for performing a re-rating process, according to one embodiment.
Figure 5B:
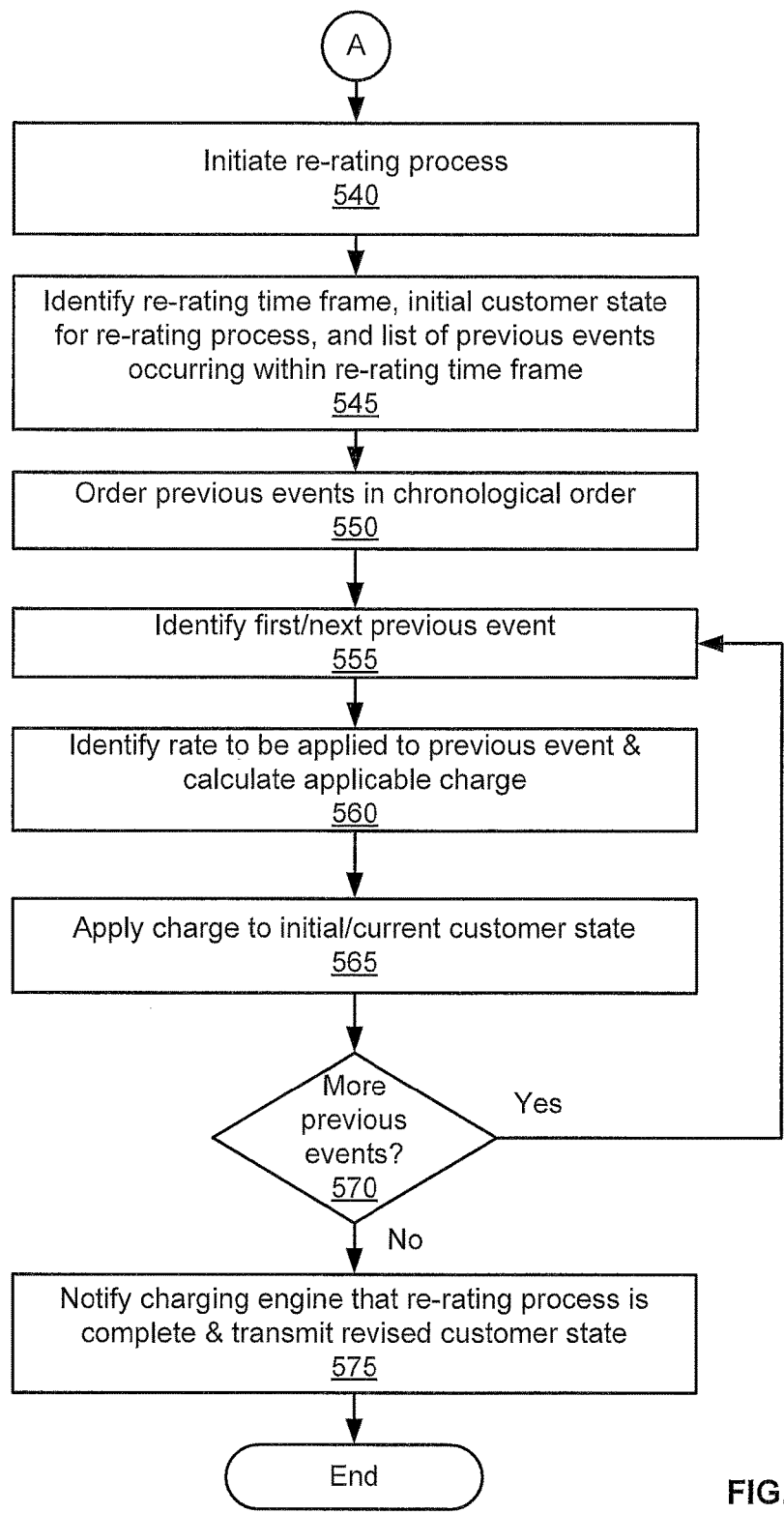
FIG. 5B is a flowchart illustrating an example process for performing a re-rating process, according to one embodiment.

The process then continues to 450. At 450, the re-rating management module transmits a response to the re-rating module which indicates that the re-rating process is possible and will be performed. FIGS. 5A and 5B illustrate further details regarding the re-rating process. At this point, the process ends.

FIGS. 5A and 5B illustrate an example re-rating process. The re-rating process is performed by a re-rating module, such as re-rating module 115 of FIG. 1. In addition, the re-rating process is performed in response to a customer service provider requesting a change to a customer service account.

The process begins at 510, where the re-rating module attempts to begin a re-rating process by sending an update request to a re-rating management module at a charging engine. The transmission of the update request serves as a request for permission to perform the re-rating process. Whether permission is granted or not depends upon the state of the charging engine and the associated customer service accounts.

Once the update request has been sent to the charging engine, the re-rating module awaits a response to the update request at 520. A re-rating process should not be initiated until the re-rating management module indicates such re-rating is allowable. The process continues to 530, where the re-rating module makes a determination as to whether a response to an update request has been received. If no such response has been received, the process returns to 520 to continue waiting for a response to the update request.

On the other hand, if a response to the update request has been received from the re-rating management module, the process continues to 540 in FIG. 5B. At 540, the re-rating module can initiate the re-rating process. Thereafter, the process continues to 545, where the initiation of the re-rating process continues by identifying the re-rating time frame, an initial customer state, a list of previous events to be re-rated, a rate to be applied to usage requests, and so on.

The re-rating module then orders the previous events in chronological order at 550. The first previous event from the list is identified at 555. A rate applicable to the first previous event is identified at 560 and a corresponding charge is calculated for the first previous event. The rate to be applied to the first previous event can be determined by the contents of a usage request or by the re-rating module based on details within the customer service account. Once identified, the corresponding charge can be determined using the rate and the amount of usage.

The calculated charges from 560 are then applied to the initial customer state at 565. An initial customer state describes a customer state that may back out all charges arising from the previous events included in the re-rating window of time. Once the calculated charges for the first previous event are applied to the initial customer state, the existing customer state is considered to be the current customer state.

The process then continues to 570, where the re-rating module determines whether additional previous event remain to be processed in the re-rating time frame. If additional previous events are in need of re-rating, the process returns to 555, where the re-rating module identifies the next previous event in the chronological list of previous events. An applicable rate and charge for the next previous event are then identified at 560. The calculated charges for the next previous event are then applied to the current customer state to arrive at a more recent customer state at 565.

The process arrives back at 570, where the re-rating module determines whether more previous events exist. If there are no more previous events in the chronological list of previous events, the process continues to 575. At 575, the re-rating module notifies the re-rating management module that the re-rating process is complete. In addition, a revised customer state is also transmitted to the re-rating management module to reflect the effects of the re-rating process. At this point, the process ends.

Figure 6:
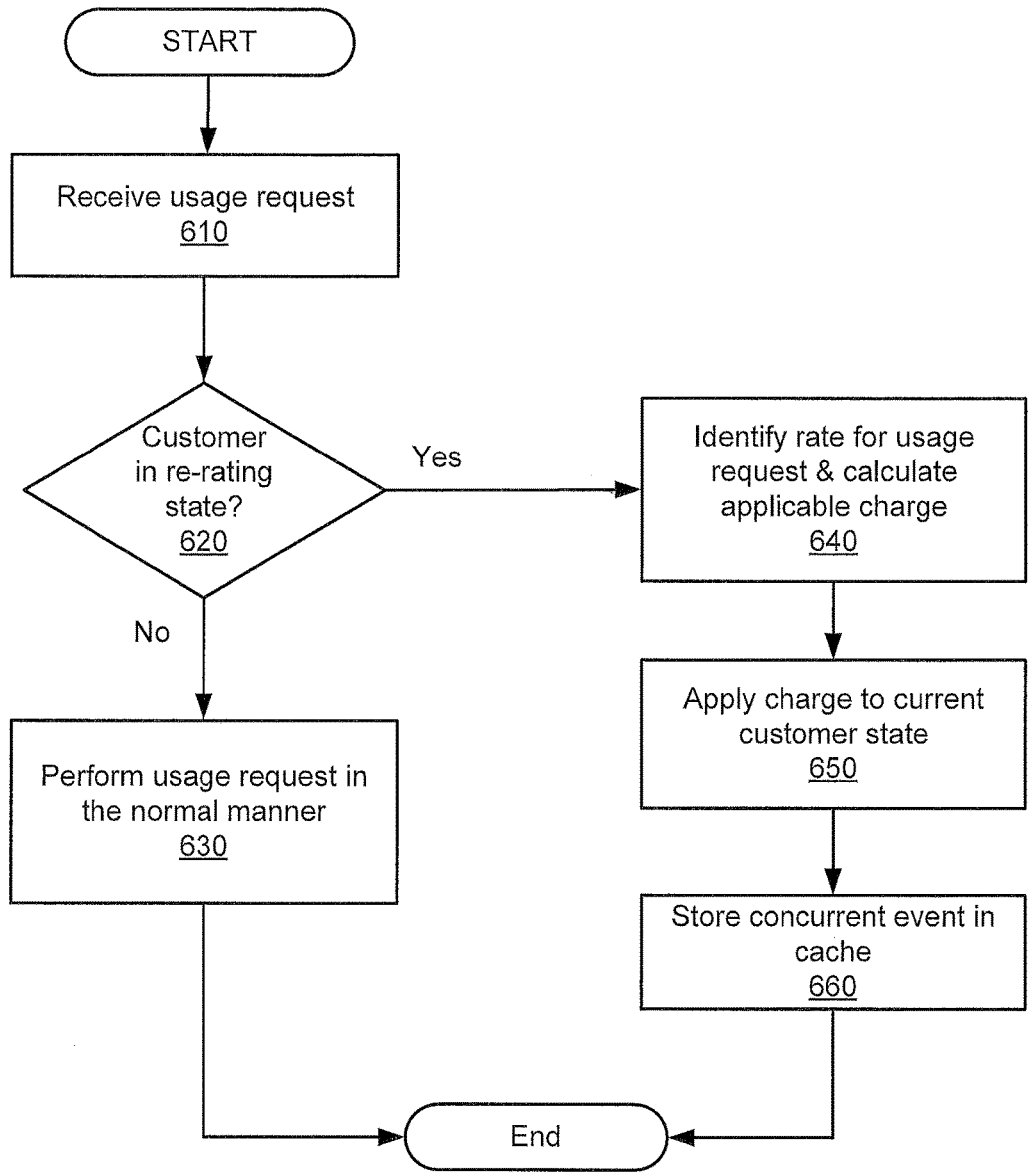
FIG. 6 is a flowchart illustrating an example process for processing usage requests, according to one embodiment.

FIG. 6 illustrates an example flowchart for processing usage requests (including concurrent usage requests that are received during a re-rating process). The process of FIG. 6 may be performed by a charging engine, such as charging engine 130 of FIG. 1, while a re-rating process is ongoing.

The process of FIG. 6 begins at 610, where the charging engine receives a usage request from a customer. In response thereto, the process continues to 620, where a determination is made as to whether the customer is in a re-rating state. Such a determination can be made using customer state information maintained by the charging engine. For example, whenever a re-rating process is to be performed for the customer, the charging engine marks the customer service account (e.g., modifies the customer state information) to indicate that the customer service account is currently in a re-rating state. In addition, customer state information may be changed upon completion of a re-rating process.

If a determination is made that the customer is not in a re-rating state, the process continues to 630, where the usage request is processed in the normal manner. Processing a usage request in the normal manner means that the charging engine and the billing management system share usage information with each other and synchronize customer states maintained at both systems when the usage request is being processed. For example, a charging engine may calculate applicable rates and charges for the usage, deduct such charges from the customer state maintained at the charging engine, and transmit such usage information to the billing management system for synchronization of a customer state maintained therein.

By contrast, if it is determined that the customer is in a re-rating state, the process continues to 640, where the usage request is processed as a concurrent usage request. A concurrent usage request is processed in a different manner than a usage request. As an example, usage information is not transmitted to the billing management system when the concurrent usage request is processed. Instead, usage information for the concurrent usage request is maintained at the concurrent request processing module and the charging engine throughout the duration of the re-rating process (e.g., in a cache).

As shown, a concurrent request is processed via 640, 650, and 660. At 640, a rate to be applied to the concurrent usage request is identified. This rate can be calculated based on information within a customer state, a timestamp for the concurrent usage request, and/or any applicable discounts to be used for the customer service account. A charge for the concurrent usage is then calculated at 650 using the rate identified at 640. Once calculated, the charge can be applied to a current customer state maintained by the charging engine at 660. The current customer state maintained by the charging engine does not include any corrections for a re-rating process, since the re-rating process is still ongoing. The concurrent request processing module will operate under the assumption that the current customer state maintained at the charging engine is the most up-to-date customer state and proceed accordingly. In order to prepare for subsequent replays and synchronizations that will be needed after the re-rating process is completed by the re-rating module, the concurrent event (e.g., which represents the occurrence of the concurrent usage) is stored in a cache at 660.

At this point, the process of FIG. 6 ends. The process of FIG. 6 can be repeated any time a usage request is received by a charging engine.

Figure 7:
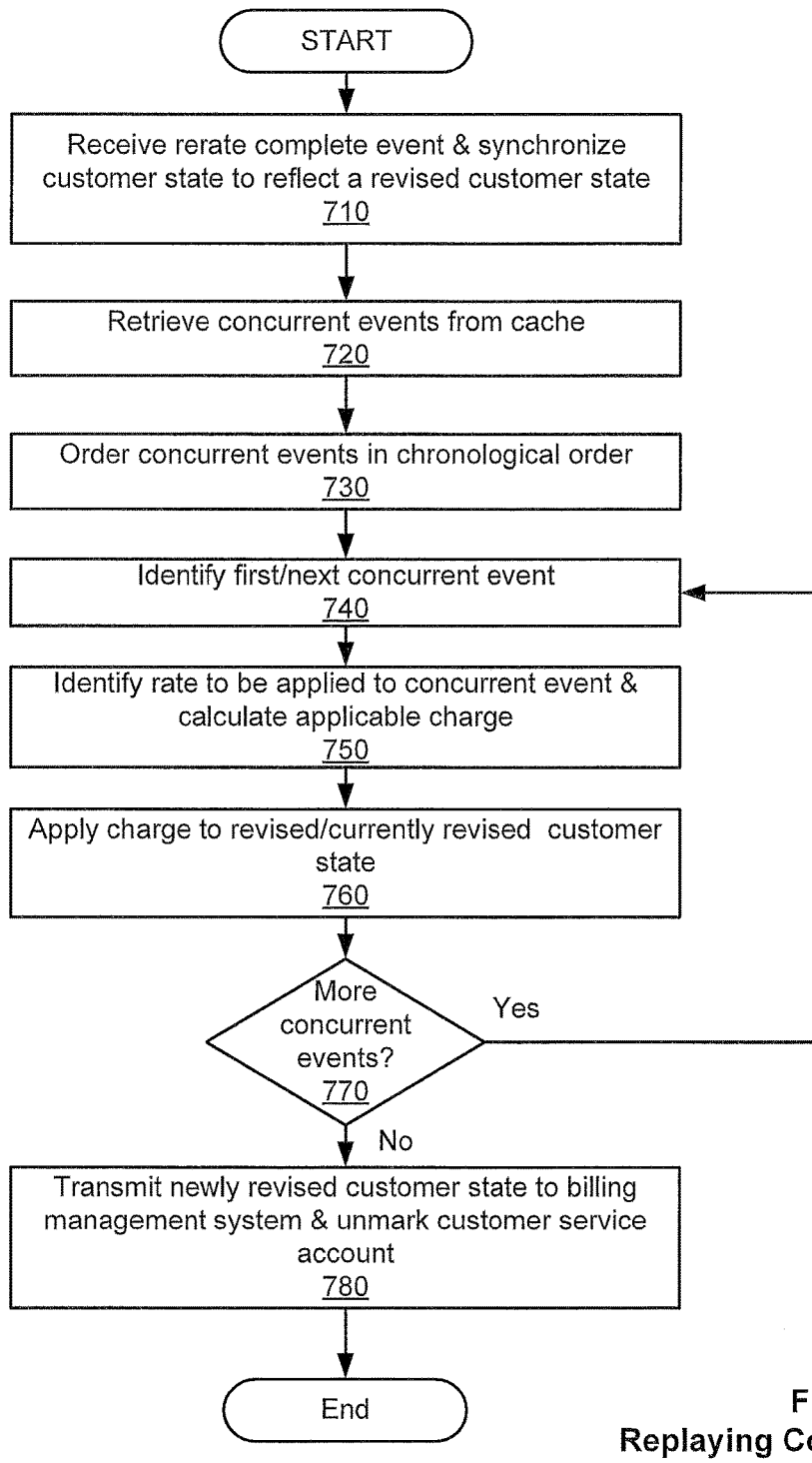
FIG. 7 is a flowchart illustrating an example process for replaying concurrent events after a re-rating process is complete, according to one embodiment.

FIG. 7 illustrates an example of a replay of concurrent events, which is performed upon receipt of re-rate complete event (e.g., an event received from a re-rating module to indicate that the re-rating process is complete). The process of FIG. 7 is performed by a re-rating management module, such as re-rating management module 135 of FIG. 1, and a concurrent request processing module, such as concurrent request processing module 138 of FIG. 1.

The process of FIG. 7 begins at 710, where a rerate complete event is received. The rerate complete event serves as a notification to the charging engine that the re-rating process is complete by the billing management system. In addition, the customer state maintained at the charging engine is synchronized with the revised customer state received from the billing management system at 710. This revised customer state reflects the effects of the re-rating process. By performing such synchronization, the customer state maintained at the charging engine can reflect the effects of the re-rating process (e.g., the re-rating of previous events during a particular window of time).

Thereafter, a replay of concurrent events is performed by the concurrent request processing module to capture the effects (e.g., applicable charges) of concurrent events on the revised customer state, thereby arriving at a newly-revised customer state which reflects the effects of the re-rating process and the concurrent events. The replay of concurrent events is illustrated as 720-770.

In order to begin replaying concurrent events (e.g., usage requests received by the concurrent request processing module while the re-rating module was performing the re-rating process), the concurrent request processing module retrieves the concurrent events from cache at 720. These concurrent events are the events that were held by the concurrent request processing module at 660 in FIG. 6 and not transmitted to the billing management system. Once the concurrent events have been retrieved from cache, the concurrent request processing module can proceed to 730. At 730, the concurrent events are ordered in chronological order to prepare for replay.

The process continues to 740, where the first (e.g., earliest) concurrent event is identified. At 750, a rate applicable to the first concurrent event is identified. This rate can be re-calculated at this point based on a current customer state, applicable discounts, and so on. Once the applicable rate has been identified, applicable charges for the first concurrent event are calculated. The process then continues to 760. At 760, the charging engine applies the charges for the first concurrent event to the revised customer state. The resulting customer state is considered to be a newly-revised customer state that reflects the effect of the first concurrent event (as well as the re-rating process).

At 770, a determination is made as to whether additional concurrent events remain to be replayed. If additional concurrent events are in need of replaying, the process returns to 740, where the next (e.g., second to earliest) concurrent event is identified. An applicable rate and applicable charges for the next concurrent event are identified and calculated at 750. The corresponding charges for the next concurrent event are then applied to the newly-revised customer state at 760.

The process continues to loop through 740, 750, and 760 until a determination is made at 770 that no more concurrent events remain for replay. In this case, the process continues to 780. At 780, the concurrent request processing module transmits the newly-revised customer state to the billing management system for synchronization therein. The newly-revised customer state that is transmitted to the billing management system can represent a delta value. The re-rating management module can also modify customer state information for the customer, at 780, to indicate that the re-rating module is no longer performing a re-rating process for the customer. At this point, the process ends.

Figure 8:
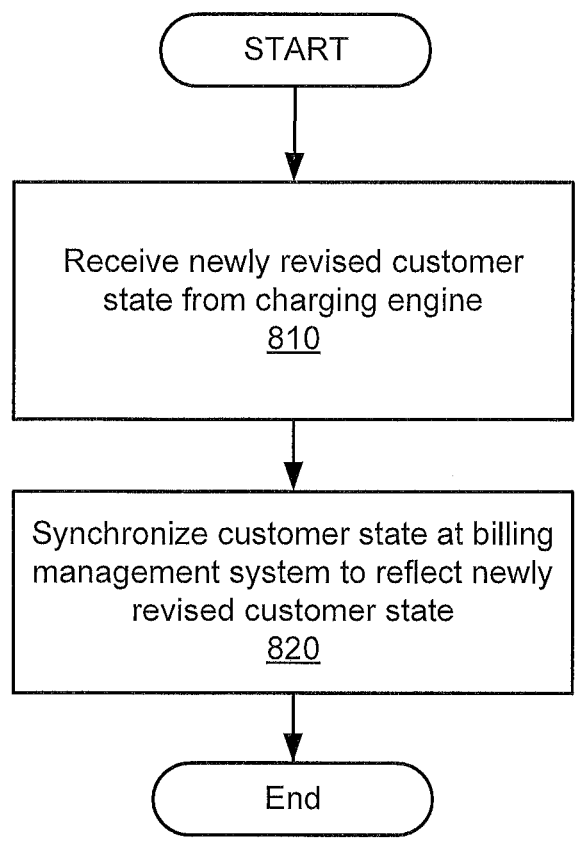
FIG. 8 is a flowchart illustrating an example process for synchronizing a customer state at a billing management system, according to one embodiment.

FIG. 8 is a flowchart illustrating an example synchronization of a customer state at a billing management system. The process of FIG. 8 is performed by a billing management system, such as billing management system 110 of FIG. 1, to update a customer state for a customer service account.

The process of FIG. 8 begins at 810, where the billing management system receives a newly-revised customer state from the charging engine. The newly-revised customer state that is received by the billing management system reflects the effects of rating any and all concurrent usage.

A billing management system includes customer state information that is current through the end of the re-rating process. However, this customer state information does not include the effects of any concurrent usage. Once the concurrent request processing module has replayed the concurrent events on the revised customer state, the newly-revised customer state is transmitted by the concurrent request processing module to the billing management system for synchronization therein.

The newly-revised customer state information received by the billing management system at 810 may be in the form of customer state values that are to replace customer state values maintained by the billing management system. Alternatively, the newly-revised customer state information received at 810 may be in the form of delta values to be applied to the current customer state at the billing management system.

The process then continues to 820. At 820, the billing management system utilizes the customer state information received at 810 to synchronize the customer state at the billing management system. Synchronizing the customer state allows the billing management system to update its values to reflect the effects of the re-rating process and the subsequent replay of concurrent events. At this point, the process ends.

An Example Computing and Network Environment

As shown above, the present invention can be implemented using a variety of computer systems and networks. An example of one such computing and network environment is described below with reference to FIGS. 9 and 10.

Figure 9:
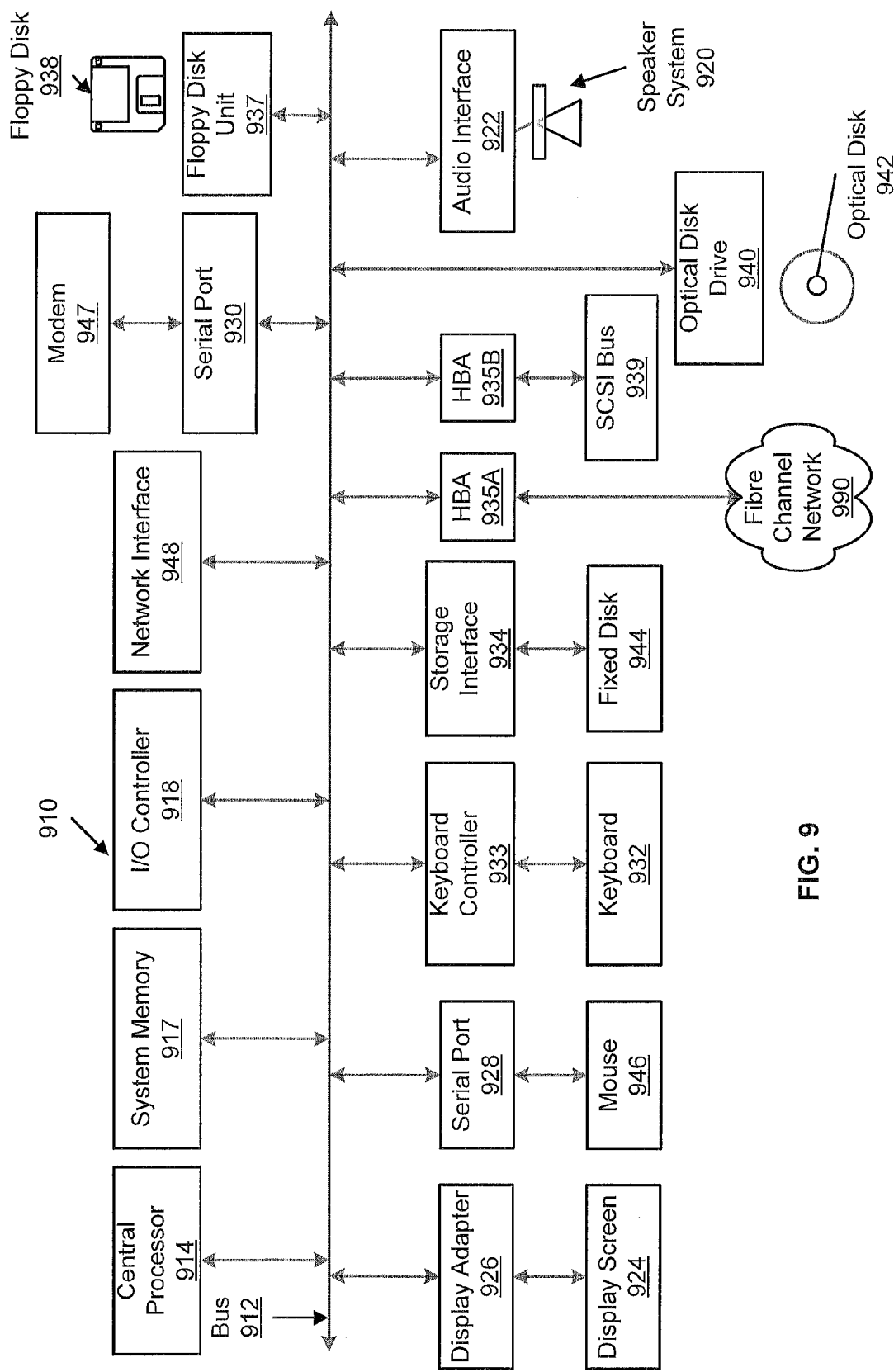
FIG. 9 is a simplified block diagram of an example computer system for implementing aspects of the present disclosure, according to one embodiment.

FIG. 9 depicts a block diagram of a computer system 910 suitable for implementing aspects of the present invention. Computer system 910 includes a bus 912 which interconnects major subsystems of computer system 910, such as a central processor 914, a system memory 917 (typically RAM, but which may also include ROM, flash RAM, or the like), an input/output controller 918, an external audio device, such as a speaker system 920 via an audio output interface 922, an external device, such as a display screen 924 via display adapter 926, serial ports 928 and 930, a keyboard 932 (interfaced with a keyboard controller 933), a storage interface 934, a floppy disk unit 937 operative to receive a floppy disk 938, a host bus adapter (HBA) interface card 935A operative to connect with a Fibre Channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 914 and system memory 917, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 910 are generally stored on and accessed via a computer-readable medium, such as a hard disk drive (e.g., fixed disk 944), an optical drive (e.g., optical disk drive 940), a floppy disk unit 937, or other storage medium. Additionally, applications can be in the form of electronic signals modulated in accordance with the application and data communication technology when accessed via modem 947 or network interface 948.

Storage interface 934, as with the other storage interfaces of computer system 910, can connect to a standard computer-readable medium for storage and/or retrieval of information, such as a fixed disk 944. Fixed disk drive 944 may be a part of computer system 910 or may be separate and accessed through other interface systems. Modem 947 may provide a direct connection to a remote server via a telephone link or to the Internet via an internet service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 9 need not be present to practice the present invention. The devices and subsystems can be interconnected in different ways from that shown in FIG. 9. The operation of a computer system such as that shown in FIG. 9 is readily known in the art and is not discussed in detail in this application. Code to implement the present invention can be stored in computer-readable storage media such as one or more of system memory 917, fixed disk 944, optical disk 942, or floppy disk 938. The operating system provided on computer system 910 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 10:
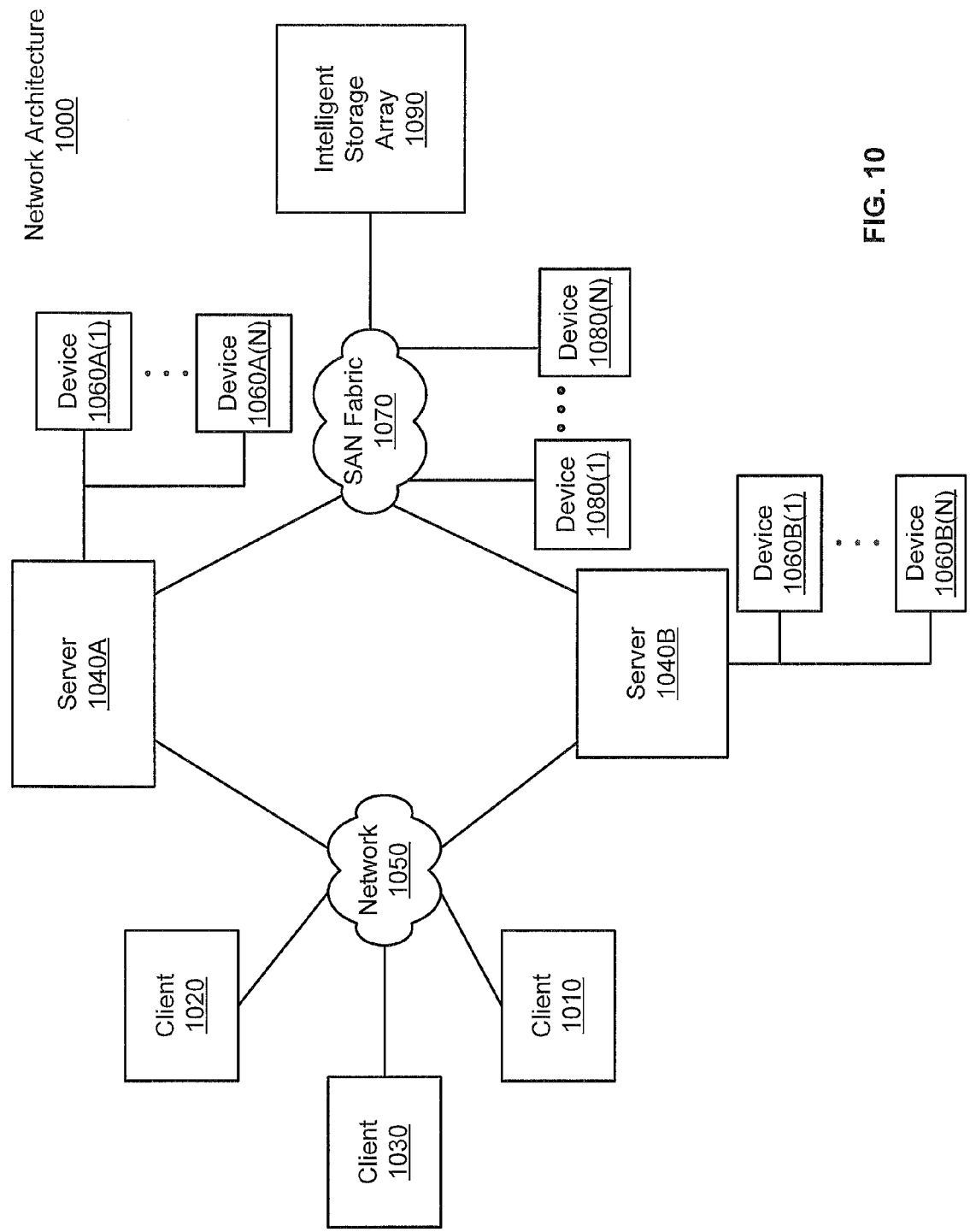
FIG. 10 is a simplified block diagram of an example network architecture for implementing aspects of the present disclosure, according to one embodiment.

FIG. 10 is a block diagram depicting a network architecture 1000 in which client systems 1010, 1020 and 1030, as well as storage servers 1040A and 1040B (any of which can be implemented using computer system 910), are coupled to a network 1050. Storage server 1040A is further depicted as having storage devices 1060A(1)-(N) directly attached, and storage server 1040B is depicted with storage devices 1060B (1)-(N) directly attached. Storage servers 1040A and 1040B are also connected to a SAN fabric 1070, although connection to a storage area network is not required for operation of the invention. SAN fabric 1070 supports access to storage devices 1080(1)-(N) by storage servers 1040A and 1040B, and so by client systems 1010, 1020 and 1030 via network 1050. Intelligent storage array 1090 is also shown as an example of a specific storage device accessible via SAN fabric 1070.

With reference to computer system 910, modem 947, network interface 948 or some other method can be used to provide connectivity from each of client computer systems 1010, 1020 and 1030 to network 1050. Client systems 1010, 1020 and 1030 are able to access information on storage server 1040A or 1040B using, for example, a web browser or other client software (not shown). Such a client allows client systems 1010, 1020 and 1030 to access data hosted by storage server 1040A or 1040B or one of storage devices 1060A(1)-(N), 1060B(1)-(N), 1080(1)-(N) or intelligent storage array 1090. FIG. 10 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 1010). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof, including the specialized system illustrated in FIG. 1.

The present invention has been described in the context of fully functional computer systems; however, those skilled in the art will appreciate that the present invention is capable of being distributed as a program product in a variety of forms, and that the present invention applies equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
  configuring a protected billing database that maintains a
    set of customer states for generating customer bills, wherein the protected billing database does not store any customer states that are based on an outdated rate;
receiving a first set of usage requests;
rating the first set of usage requests at a first rate to obtain a first set of customer states, the first set of customer states corresponding respectively to a plurality of customers;
storing the first set of customer states in the protected billing database;
receiving a request to re-rate the first set of usage requests at a second rate;
subsequent to receiving the request to re-rate the first set of usage requests:
  locking the protected billing database to prevent changes to the set of customer states stored in the protected billing database;
  receiving a second set of usage requests;
  determining a second set of customers states based on the second set of usage requests and the first set of customer states;
  wherein the second set of customer states do not include any corrections resulting from the request to re-rate the first set of usage requests;
  storing the second set of customer states in a charging database;
  wherein the second set of customer states is not stored in the protected billing database;
  re-rating the first set of usage requests at the second rate to obtain a third set of customer states;
subsequent to obtaining the third set of customer states, which includes corrections resulting from the request to re-rate the first set of usage requests:
  storing the third set of customer states in the protected billing database;
  determining a fourth set of customer states based on the second set of usage requests and the third set of customer states;
  storing the fourth set of customer states in the protected billing database;
  generating the customer bills using the fourth set of customer states stored in the protected billing database; and
wherein the method is performed by at least one device including a hardware processor.

2. The method of claim 1, wherein the processing further comprises:
subsequent to receiving the request to re-rate the first set of usage requests and prior to obtaining the third set of customer states:
  storing the second set of usage requests in a cache for replaying subsequent to obtaining the third set of customer states.

3. The method of claim 1, wherein the request to re-rate the first set of usage requests is a result of at least one of:
a change in pricing,
a change in a subscription, or
one or more out-of-order events in the customer service account.

4. The method of claim 1, wherein:
determining the second set of customer states based on the second set of usage requests and the first set of customer states comprises:
  rating the second set of usage requests at the first rate to obtain a set of one or more charges;
  reducing a set of one or more balances associated with the first set of customer states by the set of charges.

5. The method of claim 1, wherein each of the first set of customer states, the second set of customer states, the third set of customer states, and the fourth set of customer states indicates a corresponding balance associated with a respective customer service account.

6. The method of claim 1, wherein:
determining the second set of customer states based on the second set of usage requests and the first set of customer states comprises: reducing a set of one or more balances corresponding to the first set of customer states based on a set of one or more charges associated with the second set of usage requests.

7. The method of claim 1, wherein:
prior to the request to re-rate the first set of usage requests:
  the protected billing database and the charging database are synchronized with each other.

8. The method of claim 1, wherein the operations further comprise:
subsequent to receiving the request to re-rate the first set of usage requests and prior to obtaining the third set of customer states:
providing a set of one or more services requested by the second set of usage requests.

9. A non-transitory computer readable storage medium configured to store instructions that, when executed by a processor, are configured to cause the processor to perform a method comprising:
configuring a protected billing database that maintains a set of customer states for generating customer bills, wherein the protected billing database does not store any customer states that are based on an outdated rate;
receiving a first set of usage requests;
rating the first set of usage requests at a first rate to obtain a first set of customer states, the first set of customer states corresponding respectively to a plurality of customers;
storing the first set of customer states in the protected billing database;
receiving a request to re-rate the first set of usage requests at a second rate;
subsequent to receiving the request to re-rate the first set of usage requests:
  locking the protected billing database to prevent changes to the set of customer states stored in the protected billing database;
  receiving a second set of usage requests;
  determining a second set of customers states based on the second set of usage requests and the first set of customer states;
  wherein the second set of customer states do not include any corrections resulting from the request to re-rate the first set of usage requests;
  storing the second set of customer states in a charging database;
  wherein the second set of customer states is not stored in the protected billing database;
  re-rating the first set of usage requests at the second rate to obtain a third set of customer states;
subsequent to obtaining the third set of customer states, which includes corrections resulting from the request to re-rate the first set of usage requests:
  storing the third set of customer states in the protected billing database;
  determining a fourth set of customer states based on the second set of usage requests and the third set of customer states;

storing the fourth set of customer states in the protected billing database; and generating the customer bills using the fourth set of customer states stored in the protected billing database.

10. The computer readable storage medium of claim 9, wherein the method further comprises:

subsequent to receiving the request to re-rate the first set of usage requests and prior to obtaining the third set of customer states:

storing the second set of usage requests in a cache for replaying subsequent to obtaining the third set of customer states.

11. The computer readable storage medium of claim 9, wherein the request to re-rate the first set of usage requests is a result of at least one of:

a change in pricing, a change in a subscription, or one or more out-of-order events in the customer service account.

12. The computer readable storage medium of claim 9, wherein:

determining the second set of customer states based on the second set of usage requests and the first set of customer states comprises:

rating the second set of usage requests at the first rate to obtain a set of one or more charges;

reducing a set of one or more balances associated with the first set of customer states by the set of charges.

13. The computer readable storage medium of claim 9, wherein each of the first set of customer states, the second set of customer states, the third set of customer states, and the fourth set of customer states indicates a corresponding balance associated with a respective customer service account.

14. The computer readable storage medium of claim 9, wherein:

determining the second set of customer states based on the second set of usage requests and the first set of customer states comprises: reducing a set of one or more balances corresponding to the first set of customer states based on a set of one or more charges associated with the second set of usage requests.

15. The computer readable storage medium of claim 9, wherein:

prior to the request to re-rate the first set of usage requests: the protected billing database and the charging database are synchronized with each other.

16. The computer readable storage medium of claim 9, wherein the operations further comprise:

subsequent to receiving the request to re-rate the first set of usage requests and prior to obtaining the third set of customer states:

providing a set of one or more services requested by the second set of usage requests.

17. An apparatus comprising:

a processor; and a memory, coupled to the processor, wherein the memory is configured to store instructions executable by the processor to:

configure a protected billing database that maintains a set of customer states for generating customer bills, wherein the protected billing database does not store any customer states that are based on an outdated rate;

receive a first set of usage requests;

rate the first set of usage requests at a first rate to obtain a first set of customer states, the first set of customer states corresponding respectively to a plurality of customers;

store the first set of customer states in the protected billing database;

receive a request to re-rate the first set of usage requests at a second rate;

subsequent to receiving the request to re-rate the first set of usage requests:

lock the protected billing database to prevent changes to the set of customer states stored in the protected billing database;

receive a second set of usage requests;

determine a second set of customer states based on the second set of usage requests and the first set of customer states;

wherein the second set of customer states do not include any corrections resulting from the request to re-rate the first set of usage requests;

store the second set of customer states in a charging database;

wherein the second set of customer states is not stored in the protected billing database;

re-rating the first set of usage requests at the second rate to obtain a third set of customer states;

subsequent to obtaining the third set of customer states, which includes corrections resulting from the request to re-rate the first set of usage requests:

store the third set of customer states in the protected billing database;

determine a fourth set of customer states based on the second set of usage requests and the third set of customer states;

store the fourth set of customer states in the protected billing database; and generate the customer bills using the fourth set of customer states stored in the protected billing database.

18. The apparatus of claim 17, wherein the instructions are further executable to:

subsequent to receiving the request to re-rate the first set of usage requests and prior to obtaining the third set of customer states:

store the second set of usage requests in a cache for replaying subsequent to obtaining the third set of customer states.

19. The apparatus of claim 17, wherein:

determine the second set of customer states based on the second set of usage requests and the first set of customer states comprises:

rate the second set of usage requests at the first rate to obtain a set of one or more charges;

reduce a set of one or more balances associated with the first set of customer states by the set of charges.

20. The apparatus of claim 17, wherein:

prior to the request to re-rate the first set of usage requests: the protected billing database and the charging database are synchronized with each other.

* * * * *